(12) United States Patent
Din Mahamed

(10) Patent No.: US 7,823,238 B2
(45) Date of Patent: Nov. 2, 2010

(54) SHOE AND ASSOCIATED MANUFACTURING METHOD

(75) Inventor: Sayed Muslim Mirza Din Mahamed, Via Piave, 1, 63015 Monte Urano (IT)

(73) Assignees: Ideaslab SNC di Marcerta Benito, Sant'Elpidio a Mare (IT); Cristiana Mandozzi, Sant'Elpidio a Mare (IT); Sayed Muslim Mirza Din Mahamed, Sant'Elpidio a Mare (IT)

( * ) Notice: Subject to any disclaimer, the term of this patent is extended or adjusted under 35 U.S.C. 154(b) by 717 days.

(21) Appl. No.: 11/783,134

(22) Filed: Apr. 6, 2007

(65) Prior Publication Data

US 2007/0240338 A1    Oct. 18, 2007

(30) Foreign Application Priority Data

Apr. 14, 2006 (IT) .......................... BO2006A0288

(51) Int. Cl.
  A43B 13/38  (2006.01)
  A43B 13/12  (2006.01)
  A43B 13/02  (2006.01)
  B29C 49/00  (2006.01)

(52) U.S. Cl. ................... 12/146 B; 12/142 T; 12/142 G; 12/142 C; 156/245; 264/250; 264/279; 264/320; 36/102

(58) Field of Classification Search ................ 12/142 T, 12/142 G, 142 C, 146 B; 264/250, 279, 320; 156/245; 36/102, 88, 93, 4
See application file for complete search history.

(56) References Cited

U.S. PATENT DOCUMENTS

| | | | | |
|---|---|---|---|---|
| 3,121,431 A | * | 2/1964 | Rosenhaft | .................... 36/154 |
| 3,320,347 A | * | 5/1967 | Greenawalt | .................. 264/223 |
| 3,491,390 A | * | 1/1970 | Greenblatt et al. | ........ 12/142 R |
| 3,493,449 A | * | 2/1970 | Krug | ............................ 156/79 |
| 5,746,952 A | * | 5/1998 | Marshall | .................... 264/40.1 |
| 5,820,719 A | * | 10/1998 | Strickland et al. | ........... 156/245 |
| 6,042,759 A | * | 3/2000 | Marshall | .................... 264/40.1 |
| 6,523,206 B2 | * | 2/2003 | Royall | ...................... 12/142 N |
| 6,560,900 B2 | * | 5/2003 | Bray et al. | ................... 36/17 A |
| 7,008,386 B2 | * | 3/2006 | Alaimo et al. | .............. 600/592 |
| 7,484,318 B2 | * | 2/2009 | Finkelstein | .................... 36/44 |
| 2005/0011607 A1 | * | 1/2005 | Hensley et al. | .............. 156/245 |

FOREIGN PATENT DOCUMENTS

| | | |
|---|---|---|
| EP | 1 103 197 A | 5/2001 |
| FR | 2 772 563 A1 | 6/1999 |
| GB | 2 023 997 A | 1/1980 |
| GB | 2 031 265 A | 4/1980 |

* cited by examiner

*Primary Examiner*—Jila M Mohandesi
(74) *Attorney, Agent, or Firm*—Modiano & Associati; Albert Josif; Daniel J. O'Byrne

(57) ABSTRACT

A shoe comprising a sole and an upper, the sole comprising a plantar insert, at least one layer for covering the lower surface of the plantar insert with perimetric edges which substantially protrude outward with respect to the contour of the plantar insert, at least one flap for covering the upper surface of the plantar insert, which also has a perimetric border substantially protruding outward from the contour of the plantar insert. The edge and the border are rigidly coupled to each other and to the upper. The covering layer of the lower surface of the plantar insert can be covered with a base of wear-resistant material.

7 Claims, 4 Drawing Sheets

SHOE AND ASSOCIATED MANUFACTURING METHOD

The present invention relates to a shoe and to the associated manufacturing method.

BACKGROUND OF THE INVENTION

The term "shoe" is used to reference any item which is designed to be worn on the foot and follows its shape.

The main function of a shoe is to provide protection against direct contact with the ground and to cover the foot, retaining heat in winter. It also has an aesthetic function, which in recent years has become preponderant in determining sales volumes.

A shoe is formed by a part which is in contact with the ground, known as sole, which is made of leather (hide), rubber or plastics, and by an upper part, which covers the foot and is known as upper. At the level of the heel, below the sole, there is often a raised portion known as heel.

In traditional shoes, the sole is fixed (by stitching and/or adhesive bonding) to the upper and any plantar inserts and other similar elements are inserted subsequently inside the shoe thus formed.

This "traditional" constructive solution produces shoes which are substantially similar: in practice, any aesthetic differences are due exclusively to treatments for decorative purposes which are fully independent of the structural characteristics of the shoe itself.

The traditional constructive solution can have levels of comfort which are insufficient for the needs of certain users: people who wear shoes for many hours while standing to work, or more simply users with particular needs who choose only very expensive products, from which they demand maximum quality and performance.

Moreover, the traditional construction technology described above entails the need for considerable labor and the execution of a sequence of operations which is rather complicated and, even if it is possible to automate the production cycle completely, entails substantially high production costs.

SUMMARY OF THE INVENTION

The aim of the present invention is to provide a shoe which has an original aesthetic appearance and structure.

Within this aim, an object of the present invention is to provide a shoe which is particularly comfortable with excellent plantar support.

Another object of the present invention is to provide a method for manufacturing shoes which is easy to perform and inexpensive and entails a minimal number of steps.

Another object of the present invention is to provide a shoe which has low costs, is relatively simple to provide in practice and is safe in application.

This aim and these and other objects which will become better apparent hereinafter are achieved by the present shoe, of the type which comprises a sole and an upper, characterized in that said sole comprises a plantar insert, at least one layer for covering the lower surface of said plantar insert with perimetric edges which substantially protrude outward with respect to the contour of said plantar insert, at least one flap for covering the upper surface of said plantar insert which also has a perimetric border which substantially protrudes outward with respect to the contour of said plantar insert, said edge and said border being rigidly coupled to each other and to said upper, said covering layer of the lower surface of the plantar insert being coverable with a base of wear-resistant material.

BRIEF DESCRIPTION OF THE DRAWINGS

Further characteristics and advantages of the invention will become better apparent from the following detailed description of a preferred but not exclusive embodiment of a shoe and of the corresponding production method, illustrated by way of non-limiting example in the accompanying drawings, wherein.

DESCRIPTION OF THE PREFERRED EMBODIMENTS

Figure 1:
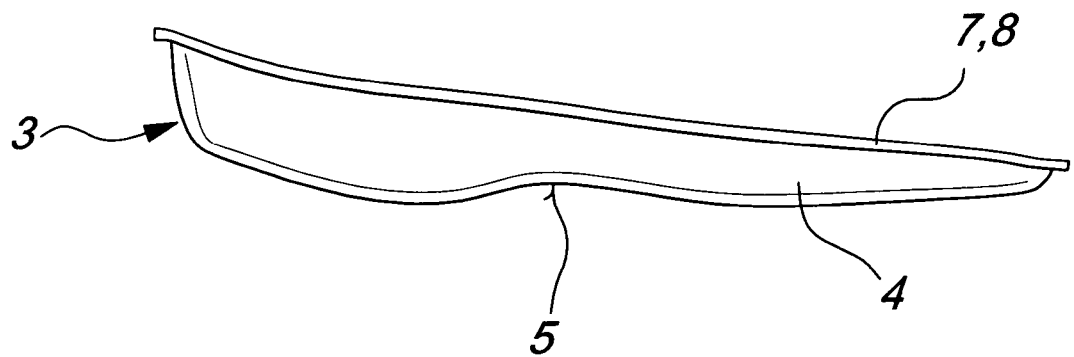
FIG. 1 is a schematic side view of a sole of a shoe according to the invention.
Figure 4:
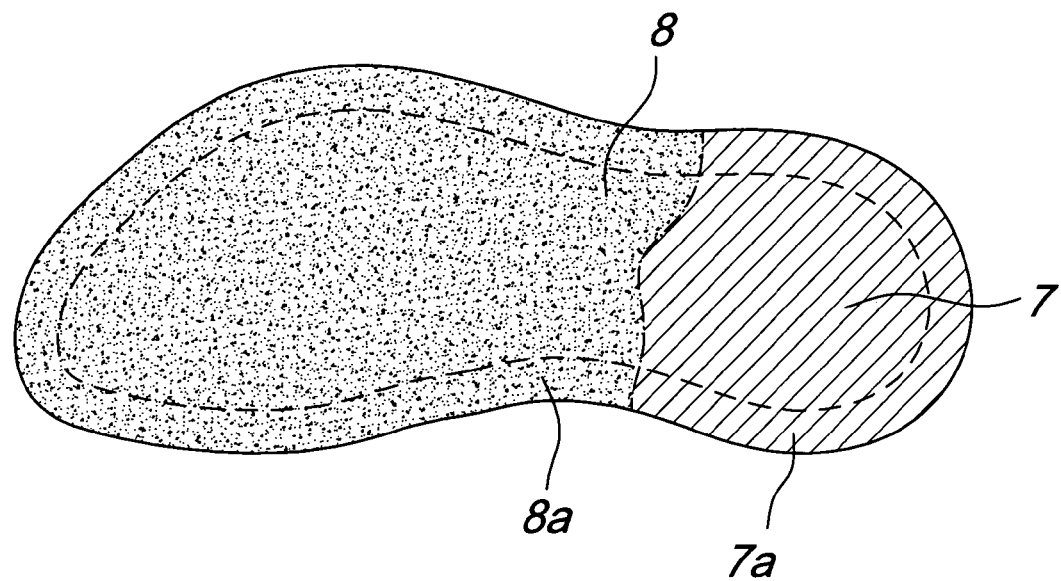
FIG. 4 is a partially sectional schematic top view of the upper portion of the sole of a shoe according to the invention.
Figure 2:
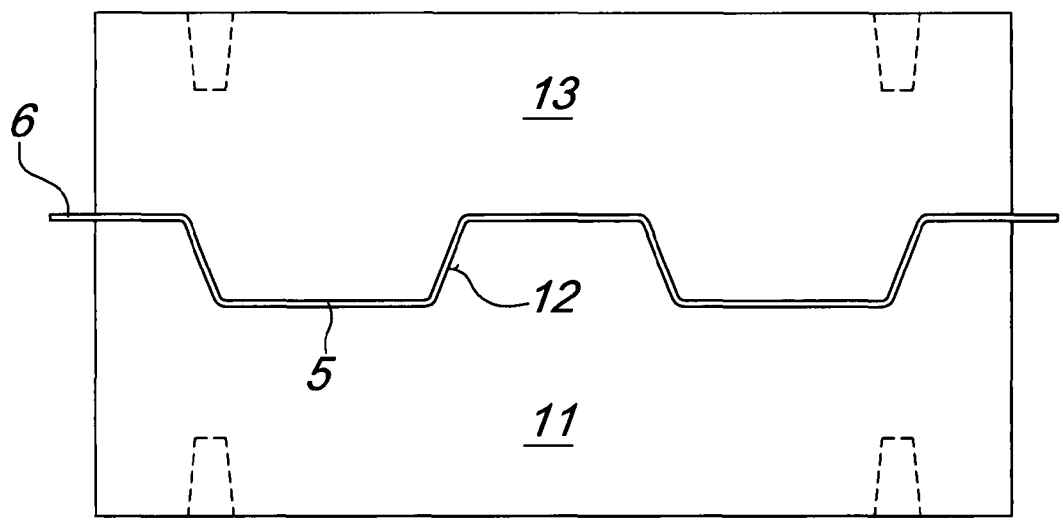
FIG. 2 is a schematic transverse view of a first die and a first plug for preforming a layer for covering the sole of a shoe according to the invention.

With reference to the figures, the reference numeral 1 generally designates a shoe according to the invention.

The shoe 1 comprises a sole 3 and an upper 2.

The sole 3 comprises a plantar insert 4, below which there is at least one covering layer 5, which is arranged so that it has perimetric edges 6 which protrude substantially outward with respect to the contour of the plantar insert 4.

The plantar insert 4 is anatomically contoured and reproduces a correct physiological curvature in order to maximize the comfort of the shoe 1.

In order to ensure this result, the plantar insert 4 is made of elastically deformable material (for example latex), which may also have an elastic deformability which can vary along its surface: particularly suitable materials for this embodiment are expanded materials, in which elastic deformability is ensured by the presence of the air bubbles which are trapped therein, which form a plurality of shock-absorbing micro-cushions.

Above the plantar insert 4, the sole 3 also comprises one or more superimposed covering flaps 7, 8, which also have a respective perimetric border 7a, 8a which protrudes substantially outward with respect to the contour of the plantar insert 4.

The flap 7 is instead constituted by a structural reinforcement sheet made of fibrous composite material (for example based on fiberglass and/or carbon fiber and/or other structural fibers), which has a high mechanical strength and substantially lies below the flap 8: the purpose of the flap 7 is to increase the structural strength of the sole 3 of the shoe 1.

In particular, the flap 8 is a base in close contact with the upper surface of the flap 7 and is intended to constitute an actual physical separation between the flap 7 and the foot of the user. The plantar insert 4 made of expanded material can in fact absorb perspiration, causing rapid degradation of the characteristics of the shoe 1: the presence of the flap 8 prevents the transfer of perspiration from the foot to the plantar insert 4, preserving for a long time the elastic deformability of the plantar insert 4.

Optionally, according to embodiments which are alternative to the one shown in the figures and are of particular practical interest, it would also be possible to apply a third flap which is simply an upper lining made of material which is adapted for contact with the foot of the user: in practice, it must be a comfortable material, which is pleasant to the touch and substantially compatible from a physiological standpoint (a particularly important characteristic if the shoe 1 is used without socks).

The edge 6 and the border 7a, 8a are mutually rigidly coupled to the upper (for example by adhesive bonding and/or stitching and/or thermal bonding).

The sole 3, in its final version ready for use, has a lower covering of the covering layer 5 which is obtained with a base 10 made of wear-resistant material.

According to a preferred but not exclusive embodiment, the covering layer 5 of the lower surface of the plantar insert 4 is made of a material such as leather: this gives the sole 3 (and therefore the entire shoe 1) excellent aesthetic qualities and, depending on the type of leather that is chosen, also a potential good resistance to abrasion and water-repellency characteristics.

As an alternative to the embodiment described above, the layer 5 and the flap 8 (even just one of them) might also be made of a material such as a fabric: in this case, by selecting among natural fabrics and synthetic fabrics it is practically possible to obtain any characteristic from a mechanical and aesthetic standpoint, as well as in terms of water-repellency and thermal insulation.

It is obvious that the layer 5 and the flap 8 may also be provided by combining (superimposing) leather and fabrics (but also materials such as so-called "non-woven fabrics") to obtain the advantages of each of the components.

Figure 3:
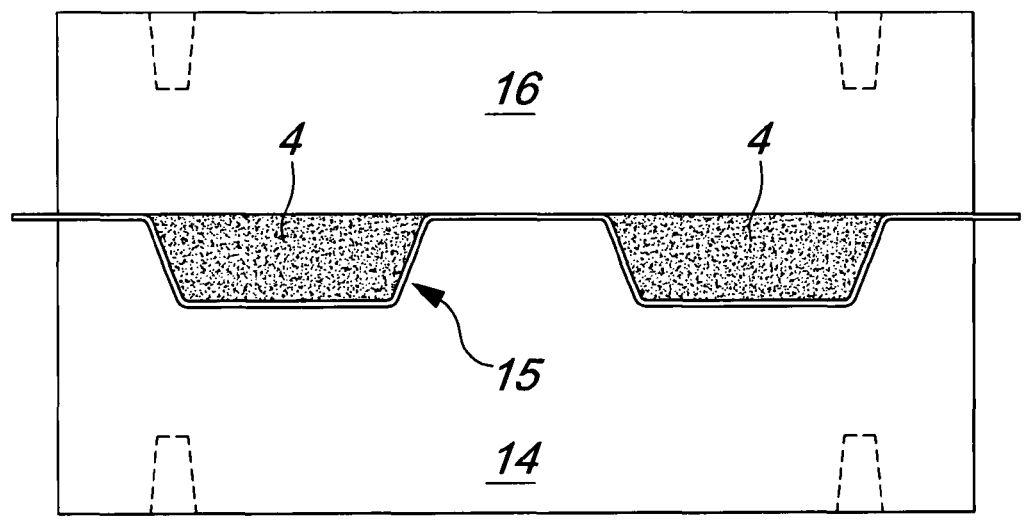
FIG. 3 is a schematic transverse view of a second die and of a second plug for providing the sole of a shoe according to the invention.
Figure 5:
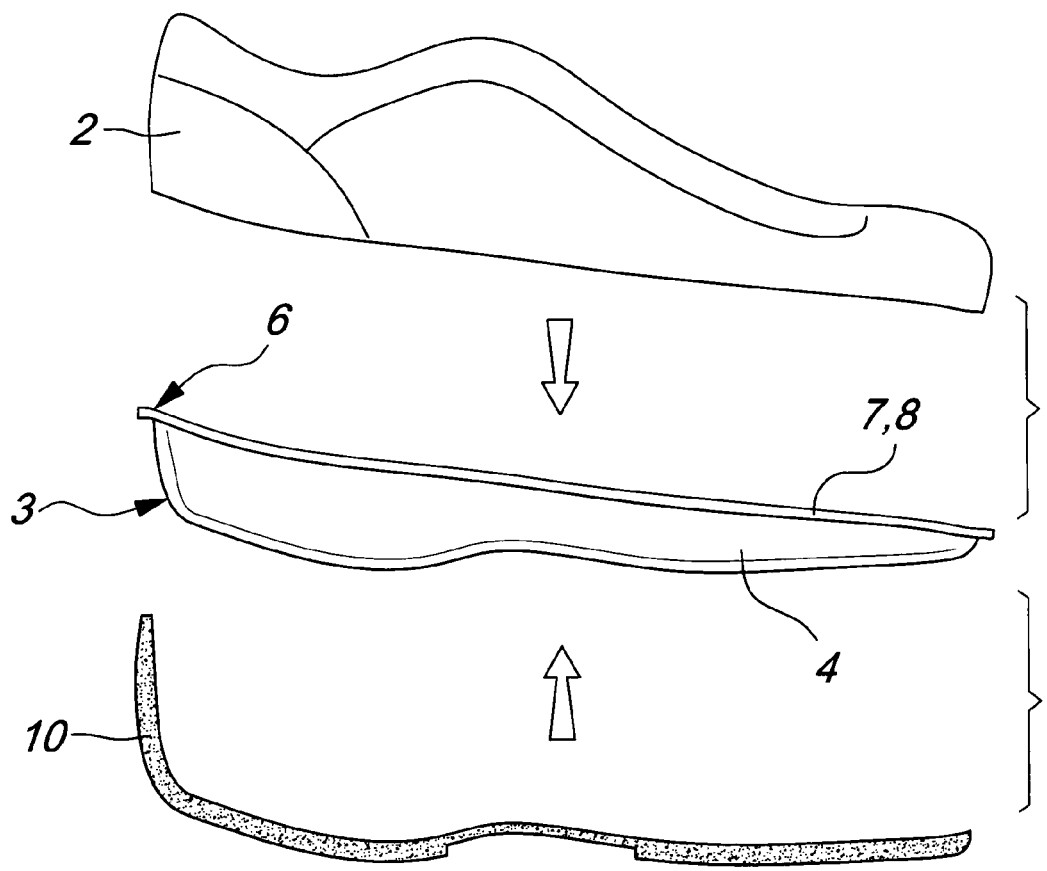
FIG. 5 is an exploded side view of a shoe according to the invention.
Figure 6:
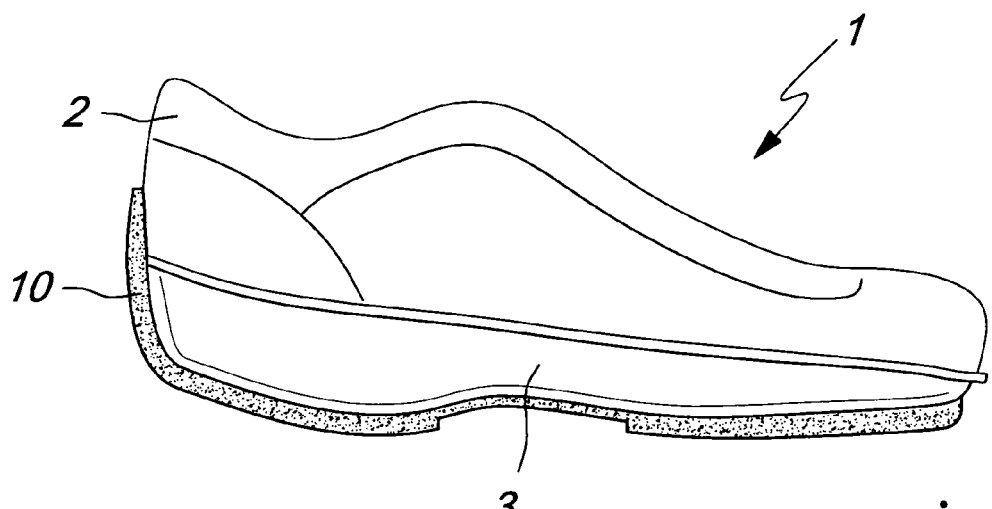
FIG. 6 is a side view of the shoe according to the invention.
Figure 7:
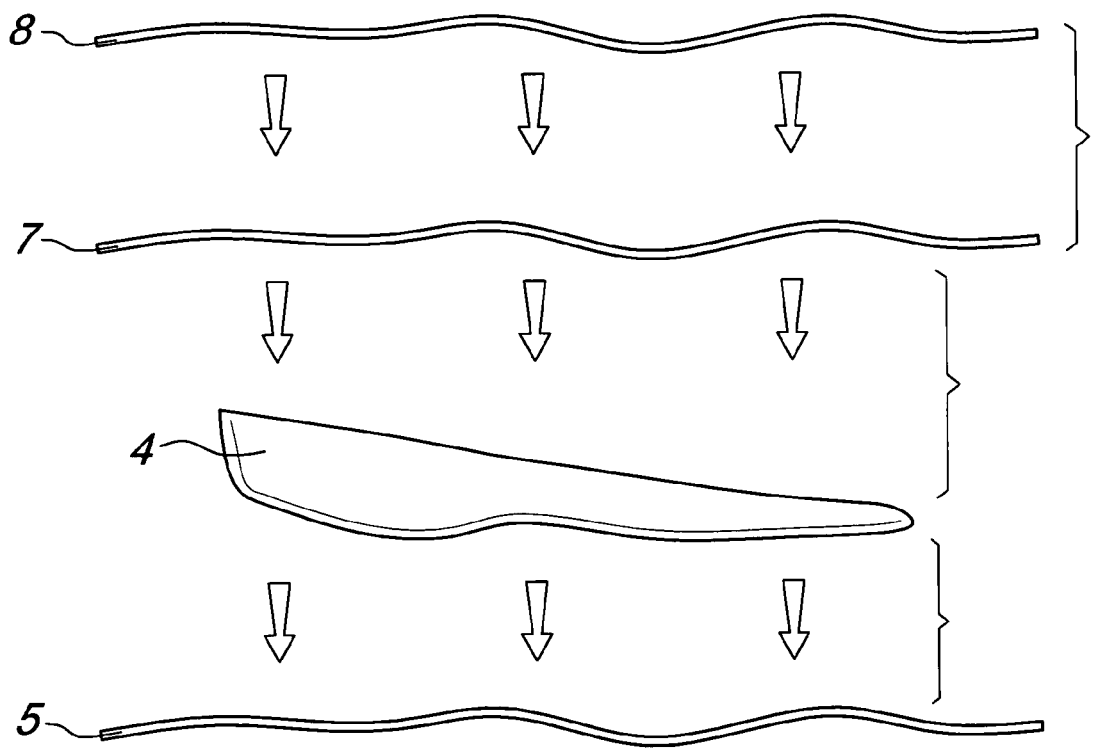
FIG. 7 is a schematic exploded side view of the components of the lower portion of the shoe according to the invention.
Figure 8:
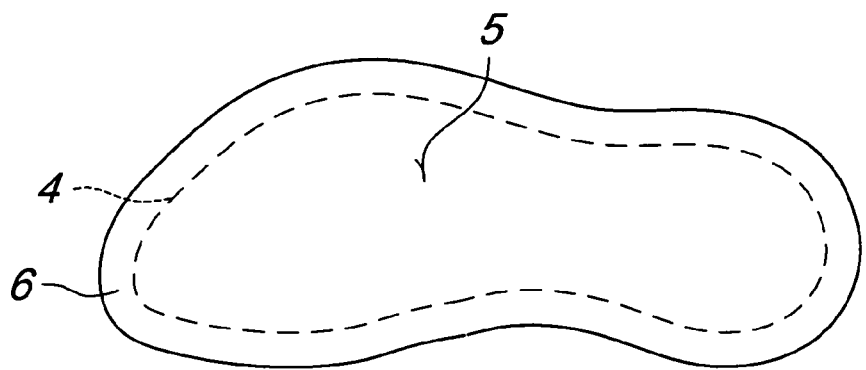
FIG. 8 is a top view of the lower portion of the sole of the shoe according to the invention.

Conveniently, the layer 5 is shaped like a valve, so as to accommodate the material that will constitute the plantar insert 4 (depending on the shoe size, the dimensions will be different). The plantar insert 4 is not an already-shaped body, but forms by filling with latex in the liquid state the layer 5 which is preformed inside the mold of FIG. 3.

The method for providing the shoe 1 according to the invention consists first of all in arranging the material that constitutes the covering layer 5 within an appropriately provided first die 11 that has a first receptacle 12, while retaining the edges 6 so that they protrude from the first receptacle 12.

At this point, it is necessary to apply a hot compression force with an appropriately provided first plug 13, which is shaped substantially complementarily to the first receptacle 12.

Subsequently, the covering layer 5 that has already been preformed is accommodated in a second receptacle 15 of a second die 14 which is shaped identically to the preceding first die 11. This is followed by the filling of said second receptacle with elastically deformable material (latex) in liquid form, and in a prior-to-expansion state, which will constitute the plantar insert 4.

The previously coupled covering flaps 7, 8 must then be arranged above the plantar insert 4 so that their lateral borders 7a, 8a protrude from the contour of the plantar insert 4. In this case, it is necessary to impart a new cold compression force with a second plug 16, which gives the chosen anatomical shape to the upper part of the plantar insert, making the edge 6 and the borders 7a, 8a adhere to each other.

Once compression has been applied, the assembly constituted by the layer 5, the plantar insert 4 and the flaps 7, 8 is extracted from the die 14.

At this point, in all cases in which the dies comprise both soles 3 (i.e., both the left sole and the right sole), it is necessary to cut the portion that joins them, mutually disengaging them.

The lower portion of the appropriately provided upper 2 (provided in accordance with the dimensions and aesthetic characteristics of the shoe 1 to be obtained) is joined to the perimetric outline of the assembly constituted by the coupling of the edge 6 and of the borders 7a and 8a, generally by stitching.

Below this assembly, it is convenient to rigidly couple the base 10 made of wear-resistant material: this may be preferably a base 10 made of substantially polymeric material (for example such as rubber), but it is also possible to use leather (or other natural materials) and/or composite materials.

According to a preferred but not exclusive embodiment, the coupling between the edge 6 and the borders 7a, 8a is obtained by stitching.

As an alternative, the same coupling can be obtained by adhesive bonding.

Likewise, the coupling between the covering layer 5, the plantar insert 4 and the covering flaps 7, 8 can be obtained by interposing between them adhesive of various kinds.

Positively, the coupling between the upper 2 and the sole 3 is obtained by stitching: this can be exposed and/or hidden, depending on the aesthetic requirements of the shoe 1 being provided.

At the end of the fixing of the upper 2 to the sole 3, a so-called finishing operation is performed which consists in inserting appropriate hot aluminum lasts for preforming the upper 2.

It has thus been shown that the invention achieves the proposed aim and objects.

The invention thus conceived is susceptible of numerous modifications and variations, all of which are within the scope of the appended claims.

All the details may further be replaced with other technically equivalent ones.

In the exemplary embodiments shown, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

In practice, the materials used, as well as the shapes and dimensions, may be any according to requirements without thereby abandoning the scope of the protection of the appended claims.

The disclosures in Italian Patent Application No. BO2006A000288 from which this application claims priority are incorporated herein by reference.

What is claimed is:

1. A method for manufacturing a shoe comprising the steps of:
   arranging a material for constituting a sole covering layer within a first die that has a first receptacle with a shape that is complementary to a shape of a sole plantar insert, while retaining a perimetric edge of said material so as to protrude from the first receptacle;
   performing hot compression with a first plug, which is shaped complementarily to the shape of the first receptacle of said first die, on said covering layer material so as to obtain a preformed covering layer;

removing from the first die and thereafter arranging the preformed covering layer in a second die with a second receptacle;

inserting a compound in a liquid, prior-to-expansion state within said second receptacle over said preformed covering layer, said compound for constituting the plantar insert;

arranging at least one covering flap of a sole above the plantar insert, so that a lateral border of said sole protrudes from a contour of the plantar insert;

performing cold compression, with a second plug, and causing a mutual adhesion of the perimetric edge of the covering layer and of the border of the at least one covering flap, whereby to form an assembly;

extracting from the second die the assembly constituted by the covering layer, the plantar insert, and the at least one flap;

mutually coupling a lower portion of an upper to a perimetric outline of said assembly, said outline being constituted by a coupling of said perimetric edge and of said border; and rigidly coupling below said assembly a bottom made of wear-resistant material.

2. The method of claim 1, comprising coupling between said edge and said border by stitching.

3. The method of claim 1, comprising coupling between said edge and said border by adhesive bonding.

4. The method of claim 1, comprising coupling between the covering layer, the plantar insert and the at least one covering flap adhesive bonding by interposition of adhesive.

5. The method of claim 1, comprising coupling between said upper and said sole by stitching.

6. The method of claim 1, wherein at the end of the fixing step of the upper to the sole, a finishing operation is performed which consists in inserting hot aluminum lasts in order to preform said upper.

7. The method of claim 1, wherein said first and second dies are provided that comprise first and second receptacles that are suitable to form together left and right soles, the method comprising, after said step for extraction of the assembly from said second die, a step for performing a blanking for dividing the left sole from the right sole.

* * * * *

UNITED STATES PATENT AND TRADEMARK OFFICE
CERTIFICATE OF CORRECTION

PATENT NO. : 7,823,238 B2  Page 1 of 1
APPLICATION NO. : 11/783134
DATED : November 2, 2010
INVENTOR(S) : Sayed Muslim Mirza Din Mahamed It is certified that error appears in the above-identified patent and that said Letters Patent is hereby corrected as shown below:

On the title page item (73) should read:
Assignees: Ideaslab SNC di Macerata Benito,
Sant'Elpidio a Mare (IT); Cristiana
Mandozzi, Sant'Elpidio a Mare (IT);
Sayed Muslim Mirza Din Mahamed,
Sant'Elpidio a Mare (IT)

Signed and Sealed this
Twenty-second Day of March, 2011

David J. Kappos
*Director of the United States Patent and Trademark Office*